(12) United States Patent
Gang et al.

(10) Patent No.: US 10,078,955 B1
(45) Date of Patent: Sep. 18, 2018

(54) EVENT-BASED DATA COLLECTION FOR SMART SENSORS ON A MASTER/SLAVE BUS

(71) Applicant: Simmonds Precision Products, Inc., Vergennes, VT (US)

(72) Inventors: Travis Gang, Hinesburg, VT (US); Benjamin D. McBride, South Burlington, VT (US); Matthew B. Burleigh, Essex, VT (US)

(73) Assignee: Simmonds Precision Products, Vergennes, VT (US)

( * ) Notice: Subject to any disclaimer, the term of this patent is extended or adjusted under 35 U.S.C. 154(b) by 0 days.

(21) Appl. No.: 15/623,574

(22) Filed: Jun. 15, 2017

(51) Int. Cl.
| | |
|---|---|
| *G08B 21/18* | (2006.01) |
| *G08B 29/04* | (2006.01) |
| *G08B 29/18* | (2006.01) |
| *H04L 12/403* | (2006.01) |
| *G07C 3/10* | (2006.01) |

(52) U.S. Cl.
CPC .............. *G08B 21/182* (2013.01); *G07C 3/10* (2013.01); *G08B 29/04* (2013.01); *G08B 29/188* (2013.01); *H04L 12/403* (2013.01)

(58) Field of Classification Search
CPC .......... G07C 3/10; G08B 29/04; G08B 29/02; G08B 29/188; G08B 13/19639; G08B 13/19673; G08B 1/08; G08B 23/00; G08B 26/00; G08B 26/008; G08B 25/00; G08B 25/002; G08B 25/007; G08B 25/009; G08B 25/01; G08B 25/012; G08B 25/014; G08B 25/04; G08B 25/14; H04L 12/403; H04L 12/40019; G06K 2009/00739

See application file for complete search history.

(56) References Cited

U.S. PATENT DOCUMENTS

| | | | | |
|---|---|---|---|---|
| 4,928,246 | A * | 5/1990 | Crawley ................. | G01D 1/00 340/1.1 |
| 6,122,572 | A * | 9/2000 | Yavnai ................. | G05D 1/0088 342/13 |
| 6,545,601 | B1 * | 4/2003 | Monroe ............. | B64D 45/0015 340/3.1 |
| 7,023,913 | B1 * | 4/2006 | Monroe ........... | G08B 13/19628 348/143 |
| 8,014,120 | B2 | 9/2011 | Diederichs et al. | |
| 8,140,658 | B1 | 3/2012 | Gelvin et al. | |
| 9,133,019 | B2 | 9/2015 | McCleland et al. | |
| 9,235,765 | B2 * | 1/2016 | Bentley ............. | G06K 9/00711 |
| 9,325,951 | B2 * | 4/2016 | Saptharishi ........... | H04N 7/181 |

(Continued)

*Primary Examiner* — Mirza Alam
(74) *Attorney, Agent, or Firm* — Kinney & Lange, P.A.

(57) ABSTRACT

A system and method includes a master/slave data bus, a plurality of sensing nodes, and a master node configured to communicate with the plurality of sensing nodes over the master/slave data bus. The master node is configured to command the plurality of sensing nodes into an event monitoring mode over the master/slave data bus. The plurality of sensing nodes are configured to digitize and retain a first amount of data during a listening mode of the event monitoring mode and detect an event based upon the first amount of data. The plurality of sensing nodes are further configured to drive an event trigger on the master/slave data bus upon detection of the event, and digitize and retain a second amount of data following detection of the event trigger on the master/slave data bus.

18 Claims, 3 Drawing Sheets

(56) References Cited

U.S. PATENT DOCUMENTS

| | | | | |
|---|---|---|---|---|
| 9,729,342 B2* | 8/2017 | Cohn | .................. | H04L 12/2827 |
| 9,734,693 B2* | 8/2017 | McKinley | ............ | G08B 21/187 |
| 2014/0210620 A1* | 7/2014 | Snodgrass | ............ | G08B 21/245 |
| | | | | 340/539.17 |
| 2015/0296736 A1* | 10/2015 | Cattaneo | ................. | A01J 5/007 |
| | | | | 119/14.08 |
| 2016/0148492 A1* | 5/2016 | Wada | ............... | G08B 13/19684 |
| | | | | 348/143 |

* cited by examiner

EVENT-BASED DATA COLLECTION FOR SMART SENSORS ON A MASTER/SLAVE BUS

BACKGROUND

The present disclosure relates generally to data collection, and in particular to data collection based upon event detection for smart sensors on a master/slave bus.

Condition monitoring systems are often used to monitor parameters in machinery. These systems include temperature sensors, pressure sensors, vibration sensors, and many other types of sensors, utilized to detect the development of faults. The data collected may be digitized, transformed and algorithmically processed to extract features of the monitored system. A given feature can be generated from the input of one sensor or could be dependent on the interaction of multiple sensors. Features extracted may be compared against expected values to assess the relative health of that feature. Sensor data may be monitored and evaluated on a scheduled basis and/or on an event basis. Event based monitoring is typically used to diagnose the circumstances leading to the event, identify the event, and diagnose the potential impacts of the event. Because of this, it is desirable to have data from all relevant sensors collected prior to, during, and after the event detection. This is typically accomplished by buffering data from sensors of interest, retaining the buffered data when an event is detected, and recording the additional post-event data.

Prior art condition monitoring systems included several analog sensors feeding into a central host for digitization and further processing. This implementation required individual cabling for each analog sensor which resulted in a heavy system that required a complicated installation. These issues can be mitigated by distributing digitization and processing of data out locally to the sensor. Local processing of data reduces the processing load on the host, allowing the host to perform other more complex functions, or decrease in size and complexity. Transmission of digital data allows multiple digital sensors to be connected on a single digital bus, reducing the wire weight associated with individual analog wire runs for each sensor.

In the prior art analog systems, the host was in control of all the data buffering as well as event detection, so data collection related to a detected event was relatively simple. With distributed processing, this data collection becomes more complex. It is desirable to develop methods of handling event detection and data collection for distributed processing sensor systems.

SUMMARY

A method of collecting data in a system that includes a master node and a plurality of slave sensing nodes connected via a master/slave data bus includes commanding, by the master node, the plurality of slave sensing nodes to enter an event monitoring state, wherein each of the plurality of slave sensing nodes enter a listening mode, wherein the plurality of slave sensing nodes digitize and retain first sensed data during the listening mode; detecting, by a first one of the plurality of slave sensing nodes, a detected event based upon the first sensed data; driving, by the first one of the plurality of slave sensing nodes, an event trigger on the master/slave data bus; and recording, by the plurality of slave sensing nodes, second sensed data as event data based upon the detected event.

A method of collecting data using a plurality of sensing nodes on a master/slave data bus during an event monitoring mode includes commanding, by a host node, the plurality of sensing nodes into a listening mode; collecting, by the plurality of sensing nodes, first sensed data, wherein the plurality of sensing nodes digitizes and retains the first sensed data; detecting, by a first one of the plurality of sensing nodes, an occurrence of a first event based upon the first sensed data; driving, by the first one of the plurality of sensing nodes, the master/slave bus with a first event trigger; identifying, by the host node, that the first one of the plurality of sensing nodes detected the event upon receiving the first event trigger; and instructing, by the host node, the plurality of sensing nodes, to retain an amount of the first sensed data and record second sensed data as event data.

A system includes a master/slave data bus, a plurality of sensing nodes, and a master node configured to communicate with the plurality of sensing nodes over the master/slave data bus. The master node is configured to command the plurality of sensing nodes into an event monitoring mode over the master/slave data bus. The plurality of sensing nodes are configured to digitize and retain a first amount of data during a listening mode of the event monitoring mode and detect an event based upon the first amount of data. The plurality of sensing nodes are further configured to drive an event trigger on the master/slave data bus upon detection of the event, and digitize and retain a second amount of data following detection of the event trigger on the master/slave data bus.

DETAILED DESCRIPTION

A data collection system and method is disclosed herein that performs event detection for nodes on a master/slave data bus. The system includes a host that acts as a master node for the master/slave data bus, and a plurality of slave sensing nodes, which may be digital sensors, for example. The master node commands the slave sensing nodes into an event monitoring mode, in which the slave sensing nodes enter a listening mode to continually digitize and retain an amount of data. When one of the slave sensing nodes detects an event during the listening mode, the respective sensing node drives the master/slave bus with an "event trigger." Upon detection of the event trigger on the master/slave bus, one or more of the remaining slave sensing nodes exit the listening mode and record an additional amount of event data.

Figure 1:
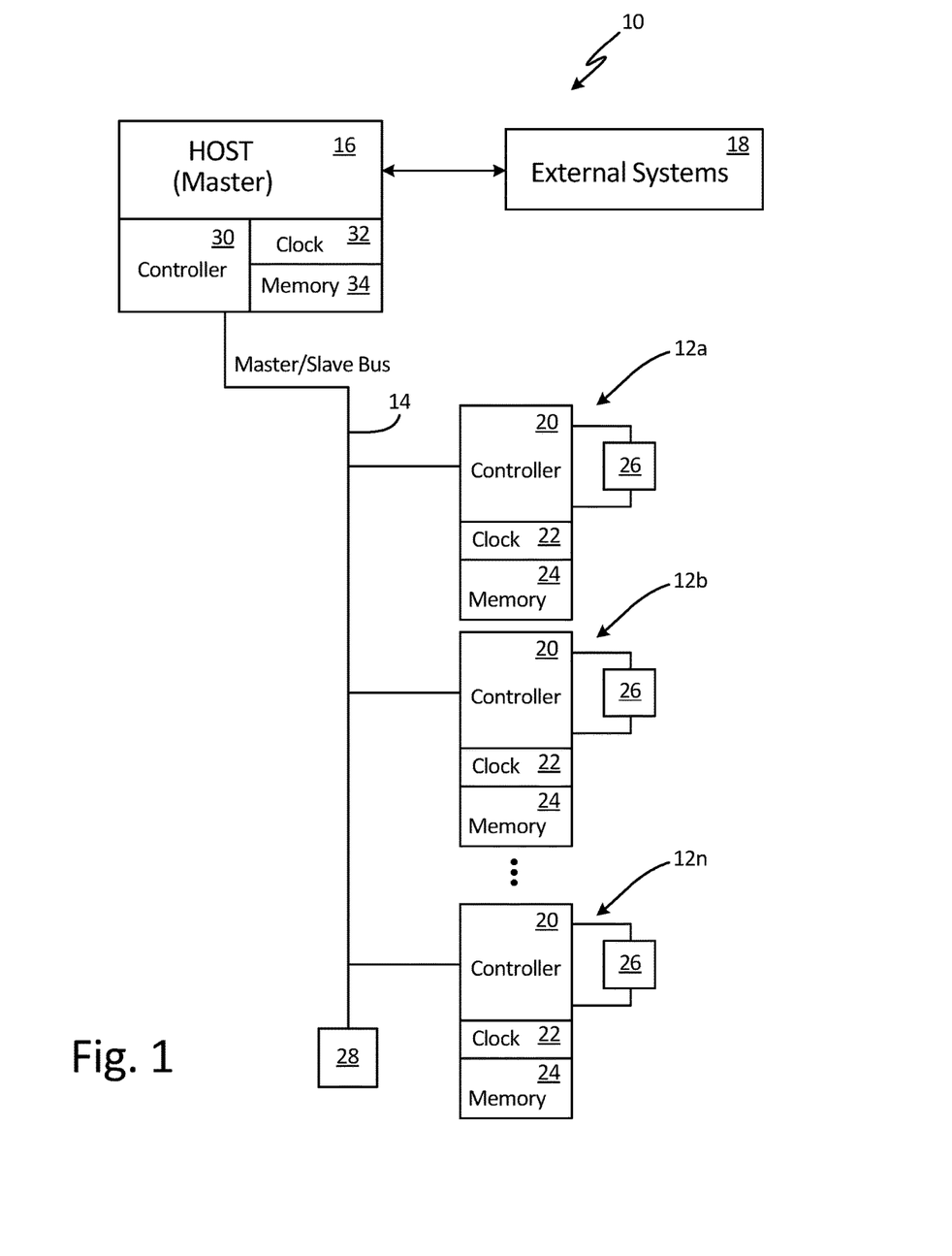
FIG. 1 is a block diagram illustrating sensing nodes connected to a host over a master/slave data bus.

FIG. 1 is a block diagram illustrating system 10 that includes nodes 12*a*-12*n* connected on master/slave bus 14. System 10 includes sensing nodes 12*a*-12*n*, master/slave bus 14, host 16 and external systems 18. Each sensing node 12*a*-12*n* includes controller 20, timer/clock 22, memory 24 and sensing element 26. Master/Slave bus 14 includes bus termination 28. Host 16 includes controller 30, timer/clock 32 and memory 34.

In an embodiment, sensing nodes 12*a*-12*n* may act as slave nodes on master/slave bus 14 with host 16 acting as the master node. Sensing nodes 12*a*-12*n* may be any nodes capable of sensing characteristics of the environment and may be digital sensors, for example, or digital interfaces for analog sensors. For example, nodes 12a-12n may be configured to sense temperature, vibration, speed, displacement, or any other characteristic. In one embodiment, system 10 may be a health and usage monitoring system (HUMS) onboard an aircraft. In other embodiments, system 10 may be any ground-based or airborne system configured to monitor characteristics of the environment.

Sensing nodes 12a-12n are connected to communicate with host 16 over master/slave bus 14. Master/slave bus 14 may implement any master/slave communication protocol in which slave nodes respond to communication from a master node. In system 10, it may be desirable to perform event based monitoring to diagnose the circumstances leading to an event, to identify the event, and to diagnose the potential impacts of the event.

Host 16 may instruct one or more sensing nodes 12a-12n to enter an "event monitoring" mode. An event may be defined as any occurrence of one or more sensed values, and may be a single occurrence or a repeated occurrence. For example, an event may be defined as a vibration or temperature exceeding a threshold. The event may be defined by the respective sensing node 12a-12n itself, or may be provided to the respective sensing node 12a-12n from host 16 at the beginning of the event monitoring mode.

After receiving the instruction from host 16 to enter the event monitoring mode, the respective sensing nodes 12a-12n may enter a listening mode. During the listening mode, each respective sensing node 12a-12n may continually digitize and retain an amount of past data. The rate of collection, and amount of data retention, may be any quantities based on the needs of system 10. For example, if node 12a is a temperature sensor, sensing node 12a may digitize the value from sensing element 26 every millisecond and store the digitized data in memory 24 for a five minute rolling interval. The amount of data to collect and retain may be known the respective sensing node 12a-12n, or may be provided by host 16 at the beginning of the event monitoring mode.

While in listening mode, one or more of sensing nodes 12a-12n may be monitoring for the occurrence of an event. For example, while digitizing and recording an amount of past data, one or more sensing nodes 12a-12n may be monitoring the past data for the occurrence of an event. Once a sensing node 12a-12n detects the event, the respective sensing node 12a-12n may drive master/slave bus 14 with an "event trigger." The event trigger may be a known logic state or pattern. For example, node 12a may detect an event and pull a communication line of master/slave bus 14 to a low impedance to indicate an event has been detected. If a second event is detected, or multiple nodes 12a-12n detect the same event, the respective sensing node 12a-12n that detected the second event may refrain from driving the event trigger, or may also drive the event trigger on master/slave bus 14. For example, if the event trigger is low impedance, multiple sensing nodes 12a-12n can drive the bus with the event trigger simultaneously without creating bus contention.

Sensing nodes 12a-12n and host 16 monitor master/slave bus 14 for the event trigger. Upon detecting the event trigger, the sensing nodes 12a-12n that are currently in listening mode may exit the listening mode, retain some or all of the past recorded data in respective memory 24, and record a desired amount of additional data as event data. For example, upon detecting an event trigger on master/slave bus 14, sensing node 12b may retain the previous five minutes of vibration data, and record an additional two minutes of vibration data as event data. The additional two minutes of data may be recorded at the same rate as the listening mode collection rate, or may be at any other desired rate of data collection.

Upon detecting an event, a respective sensing node 12a-12n may record that an event was detected in respective memory 24. The respective sensing node 12a-12n may also utilize timer/clock 22 to record a time of the detected event. This recorded time may be based upon a system time, for example, or a duration since entering the event monitoring mode. For example, sensing node 12a-12n may reset timer/clock 22 upon entering the event monitoring mode, and then record the count of timer/clock 22 upon detecting the event as the event time.

Host 16 may also record a time in which an event trigger is seen on master/slave bus 14. Like sensing nodes 12a-12n, host 16 may record the event time based upon a system time, for example, or a duration since entering the event monitoring mode. For example, host 16 may reset timer/clock 32 upon commanding sensing nodes 12a-12n into the event monitoring mode, and then record the count of timer/clock 32 upon detecting the event trigger as the event time. Likewise, sensing nodes 12a-12n that did not detect the event may record the time in which the event trigger is seen on master/slave bus 14.

Sensing nodes 12a-12n may send raw data back to host 16, or may perform local processing on the event data prior to sending the event data back to host 16. For example, if node 12a collects one thousand data points of event data, node 12a may filter the event data and provide only the one hundred most relevant data points to host 16. Because the event time may be recorded by each sensing node 12a-12n, and host 16, the data from all nodes 12a-12n may later be combined and correlated by host 16, or some other processing unit, based upon the event time. Additionally, the event time may be utilized by host 16, or some other processing unit, to extract individual features regarding the event from the data provided by sensing nodes 12a-12n. The individual features may be, for example, characteristics specific to the event. For example, a temperature or vibration profile may be extracted for a given detected event.

Host 16 may determine which sensing node 12a-12n detected the event by analyzing the data provided by sensing nodes 12a-12n, or by inquiring to sensing nodes 12a-12n following detection of the event trigger. Host 16 may also determine which sensing nodes 12a-12n recorded event data to retain based upon correlation with the event type detected. For example, if the event is a vibration event indicative of a failure of an airfoil, all sensing nodes 12a-12n that collect data related to the airfoil may be determined by host 16. These respective sensing nodes 12a-12n may then be instructed by host 16 to retain data regarding the event.

Upon completion of recording event data, sensing nodes 12a-12n may return to the listening mode and record and retain further data if an event duration has not completed. For example, host 16 may specify an event duration when instructing sensing nodes 12a-12n to enter the event monitoring mode. Sensing nodes 12a-12n may continue to listen for events until the event duration has completed. Thus, following recording of event data, if the event duration has not completed, each sensing node 12a-12n may return to listening mode and monitor for the occurrence of an event.

While described as a sensing node 12a-12n detecting an event, host 16 may also drive an event trigger on master/slave bus 14. For example, external systems 18 may include avionics, additional sensing systems, and/or manual inputs from an operator. For example, a pilot of an aircraft may press a button in the cockpit to indicate an event has occurred. This indication may be received by host 16 and host 16 may then drive an event trigger on master/slave bus 14. Sensing nodes 12a-12n may see the event trigger on master/slave bus 14 and act in accordance with the event trigger.

Figure 2:
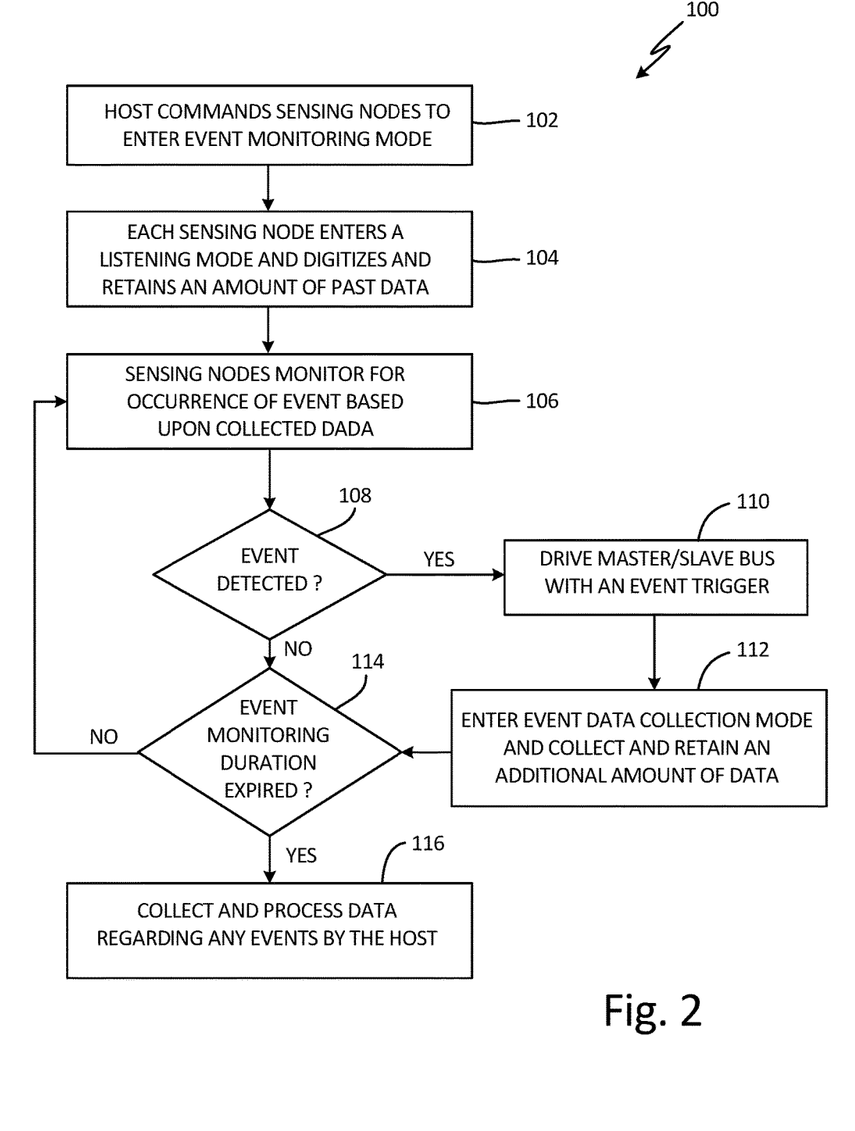
FIG. 2 is a flowchart illustrating a method of event-based data collection over a master/slave data bus.

FIG. 2 is a flowchart illustrating method 100 of collecting data for system 10. At step 102, host 16 commands sensing nodes 12a-12n to enter an event monitoring mode. When commanding nodes 12a-12n into event monitoring mode, host 16 may specify details for the event monitoring. These details may include, among others, an event monitoring duration and an event type. For example, host 16 may command sensing nodes 12a-12n to monitor for a vibration that exceeds a threshold for a specified time period.

At step 104, each sensing node 12a-12n enters a listening mode. During the listening mode, each sensing node 12a-12n may continuously digitize and retain an amount of past data. The rate at which each sensing node 12a-12n samples and retains data may be known by the respective node 12a-12n based upon the event type, or may be specified by host 16 when instructing sensing nodes 12a-12n to enter event monitoring mode, for example.

At step 106, the event is monitored for by at least one of sensing nodes 12a-12n. While all sensing nodes 12a-12n may be continually digitizing and retaining data during listening mode, not all sensing nodes 12a-12n may be capable of detecting the specified event. For example, if monitoring for a vibration exceeding a threshold, a temperature sensor may not be able to detect the event. However, temperature data may be desired in conjunction with the vibration data in relation to the event. Thus, all sensing nodes 12a-12n may digitize and retain data, while any number of sensing nodes 12a-12n may be monitoring for occurrence of the specified event.

At step 108, if a sensing node 12a-12n detects an event, or an event is indicated by external systems 18, method 100 proceeds to step 110 and the respective sensing node 12a-12n or host 16 drives master/slave bus 14 with an event trigger. The event trigger may be a specified logic state or pattern, for example. By driving master/slave bus 14 with a known logic state or pattern, all other sensing nodes 12a-12n, and host 16, can see that an event has been detected by one of sensing nodes 12a-12n or external systems 18. Additionally, if more than one sensing node 12a-12n detects the event, multiple nodes 12a-12n may drive the bus with the event trigger, as the nodes 12a-12n will be driving the same event trigger pattern, which does not result in bus contention.

At step 112, sensing nodes 12a-12n enter an event data collection mode in which each sensing node 12a-12n records an amount of event data. The amount collected may be known by each of sensing nodes 12a-12n based upon the type of event, or may be specified by host 16 prior to the event detection. This may be any desirable amount of data based upon the detected event.

If no event was detected at step 108, or if the event data collection at step 112 has completed, method 100 proceeds to step 114. At step 114, it is determined if an event monitoring duration has expired. If the duration has not expired, method 100 returns to step 106, and each sensing node 12a-12n continues in the listening mode. If the duration has completed, method 100 proceeds to step 116.

At step 116, host 16 or other central processing device, may obtain the data from sensing nodes 12a-12n regarding the detected event. This data may be preprocessed by one or more of sensing nodes 12a-12n, or may be provided as raw data to host 16. For example, host 16 may request the data one at a time from each individual sensing node 12a-12n over master/slave bus 14. Host 16 may then process the data from sensing nodes 12a-12n to extract individual features regarding the event, for example.

Figure 3:
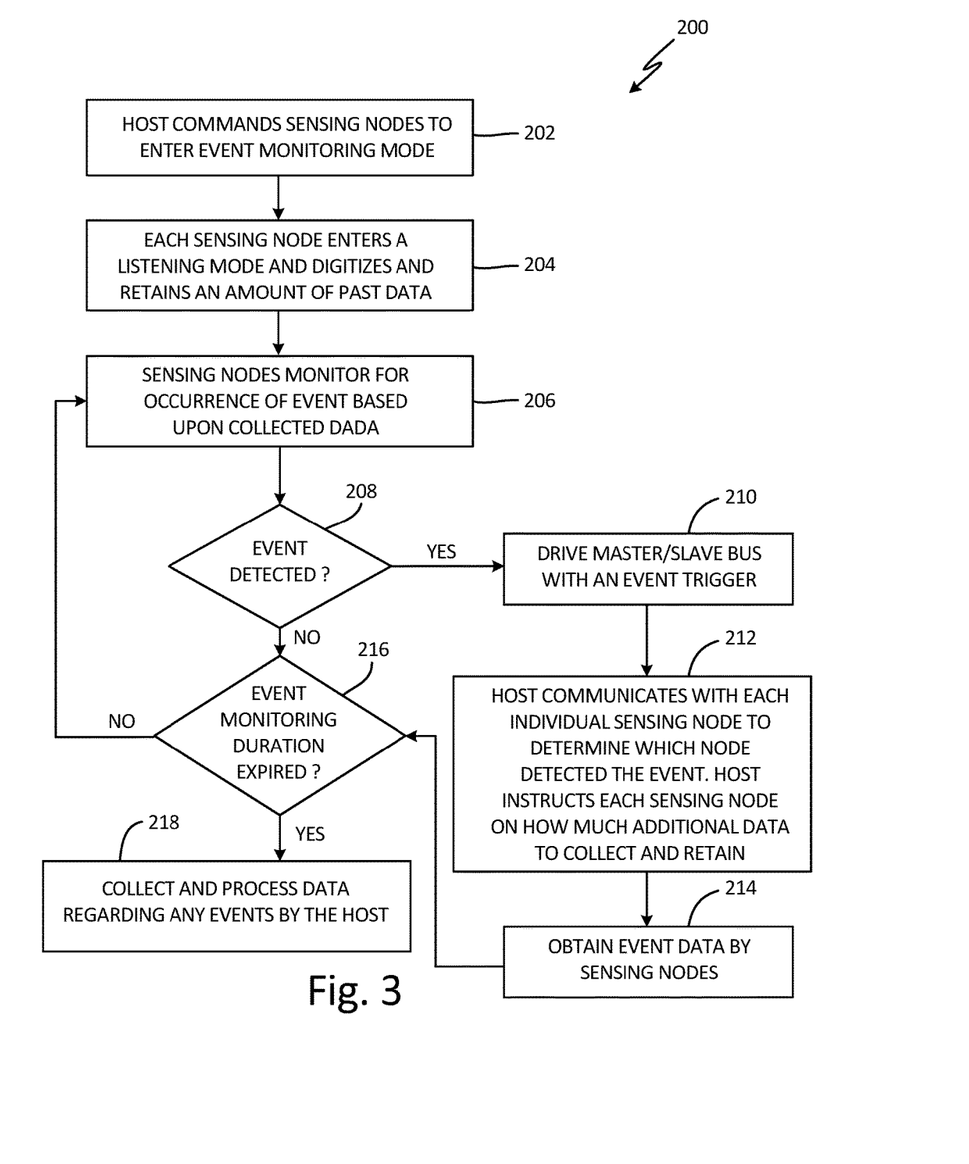
FIG. 3 is a flowchart illustrating a method of event-based data collection over a master/slave data bus.

FIG. 3 is a flowchart illustrating method 200 of collecting data using system 10 according to another embodiment. At step 202, host 16 commands sensing nodes 12a-12n to enter an event monitoring mode. When commanding nodes 12a-12n into event monitoring mode, host 16 may specify details for the event monitoring. These details may include, among others, an event monitoring duration and an event type. For example, host 16 may command sensing nodes 12a-12n to monitor for a vibration that exceeds a threshold for a specified time period.

At step 204, each sensing node 12a-12n enters a listening mode. During the listening mode, each sensing node 12a-12n may continuously digitize and retain an amount of past data. The rate at which each sensing node 12a-12n samples and retains data may be known by the respective node 12a-12n based upon the event type, or may be specified by host 16 when instructing sensing nodes 12a-12n to enter event monitoring mode, for example.

At step 206, the event is monitored for by at least one of sensing nodes 12a-12n. While all sensing nodes 12a-12n may be continually digitizing and retaining data during listening mode, not all sensing nodes 12a-12n may be capable of detecting the specified event. For example, if monitoring for a vibration exceeding a threshold, a temperature sensor would not be able to detect the event. However, temperature data may be desired in conjunction with the vibration data in relation to the event. Thus, all sensing nodes 12a-12n digitize and retain data, while any number of sensing nodes 12a-12n may be monitoring for occurrence of the specified event.

At step 208, if a sensing node 12a-12n detects an event, or an event is indicated by external systems 18, method 200 proceeds to step 210 and the respective sensing node 12a-12n or host 16 drives master/slave bus 14 with an event trigger. The event trigger may be a specified logic state or pattern, for example. By driving master/slave bus 14 with a known logic state or pattern, all other sensing nodes 12a-12n, and host 16, can see that an event has been detected by one of sensing nodes 12a-12n or external systems 18. Additionally, if more than one sensing node 12a-12n detects the event, multiple nodes 12a-12n may drive the bus with the event trigger, as the nodes 12a-12n will be driving the same event trigger pattern, which does not result in bus contention.

At step 212, host 16 communicates with each sensing node 12a-12n to determine which respective sensing node 12a-12n detected the event. Host 16 may obtain an event detected status as well as an event time from the respective node 12a-12n. Additionally, host 16 may communicate with each individual sensing node 12a-12n to instruct the respective nodes 12a-12n on how much additional event data should be collected, digitized and retained. At step 214, sensing nodes 12a-12n collect event data based upon the instruction from host 16.

If no event was detected at step 208, or if the event data collection at step 214 has completed, method 200 proceeds to step 216. At step 216, it is determined if an event monitoring duration has expired. If the duration has not expired, method 200 returns to step 206, and each sensing node 12a-12n continues in the listening mode. If the duration has completed, method 200 proceeds to step 218.

At step 218, host 16 or other central processing device, may obtain the data from sensing nodes 12a-12n regarding the detected event. This data may be preprocessed by one or more of sensing nodes 12a-12n, or may be provided as raw data to host 16. For example, host 16 may request the data one at a time from each individual sensing node 12a-12n over master/slave bus 14. Host 16 may then process the data from sensing nodes 12a-12n to extract individual features regarding the event, for example.

Discussion of Possible Embodiments

The following are non-exclusive descriptions of possible embodiments of the present invention.

A method of collecting data in a system that includes a master node and a plurality of slave sensing nodes connected via a master/slave data bus includes commanding, by the master node, the plurality of slave sensing nodes to enter an event monitoring state, wherein each of the plurality of slave sensing nodes enter a listening mode, wherein the plurality of slave sensing nodes digitize and retain first sensed data during the listening mode; detecting, by a first one of the plurality of slave sensing nodes, a detected event based upon the first sensed data; driving, by the first one of the plurality of slave sensing nodes, an event trigger on the master/slave data bus; and recording, by the plurality of slave sensing nodes, second sensed data as event data based upon the detected event.

The method of the preceding paragraph can optionally include, additionally and/or alternatively, any one or more of the following features, configurations and/or additional components:

A further embodiment of the foregoing method, further including monitoring, by the master node, the master/slave data bus for the event trigger; and recording, by the master node, an event time, wherein the event time is based upon a system time or a duration from a start of entering the event monitoring state.

A further embodiment of any of the foregoing methods, further including returning, by the first one of the plurality of slave sensing nodes, to the listening mode following recording event data, unless a duration associated with the event monitoring mode has expired or the master node has commanded the first one of the plurality of nodes to exit the event monitoring mode.

A further embodiment of any of the foregoing methods, further including recording, by the first one of the plurality of slave sensing nodes, the detected event and an event detection time associated with the event data based on a system definition of time or a duration from a start of the event monitoring mode.

A further embodiment of any of the foregoing methods, further including correlating, by the master node, the event data from the plurality of slave sensing nodes using the event detection time.

A further embodiment of any of the foregoing methods, further including extracting, by the master node, individual features regarding the detected event utilizing the event data from the plurality of slave sensing nodes.

A further embodiment of any of the foregoing methods, further including processing, by the plurality of slave sensing nodes, the event data as processed data; and providing, by the plurality of slave sensing nodes, the processed data to the master node.

A further embodiment of any of the foregoing methods, further including determining, by the master node, that the first one of the plurality of slave sensing nodes detected the detected event based upon an event type of the detected event.

A method of collecting data using a plurality of sensing nodes on a master/slave data bus during an event monitoring mode includes commanding, by a host node, the plurality of sensing nodes into a listening mode; collecting, by the plurality of sensing nodes, first sensed data, wherein the plurality of sensing nodes digitizes and retains the first sensed data; detecting, by a first one of the plurality of sensing nodes, an occurrence of a first event based upon the first sensed data; driving, by the first one of the plurality of sensing nodes, the master/slave bus with a first event trigger; identifying, by the host node, that the first one of the plurality of sensing nodes detected the event upon receiving the first event trigger; and instructing, by the host node, the plurality of sensing nodes, to retain an amount of the first sensed data and record second sensed data as event data.

The method of the preceding paragraph can optionally include, additionally and/or alternatively, any one or more of the following features, configurations and/or additional components:

A further embodiment of the foregoing method, further including detecting, by a second one of the plurality of sensing nodes, a second event; and driving, by the second node of the plurality of sensing nodes, the event trigger.

A further embodiment of any of the foregoing methods, further including detecting, by a second one of the plurality of sensing nodes, the event trigger; and recording, by the second one of the plurality of sensing nodes, an event detection time associated with the event trigger.

A further embodiment of any of the foregoing methods, further including recording, by the first one of the plurality of slave sensing nodes, the detected event and an event detection time associated with the event data based on a system definition of time or a duration from a start of the event monitoring mode.

A further embodiment of any of the foregoing methods, further including collecting, by the host node, the first and second sensed data from the plurality of sensing nodes; and correlating, by the host node, the first and second sensed data based on the event detection time.

A further embodiment of any of the foregoing methods, wherein collecting by the host node, the first and second data includes processing, by the plurality of sensing nodes, the first and second sensed data to produce processed data; and collecting, by the host node, the processed data from the plurality of sensing nodes.

A system includes a master/slave data bus, a plurality of sensing nodes, and a master node configured to communicate with the plurality of sensing nodes over the master/slave data bus. The master node is configured to command the plurality of sensing nodes into an event monitoring mode over the master/slave data bus. The plurality of sensing nodes are configured to digitize and retain a first amount of data during a listening mode of the event monitoring mode and detect an event based upon the first amount of data. The plurality of sensing nodes are further configured to drive an event trigger on the master/slave data bus upon detection of the event, and digitize and retain a second amount of data following detection of the event trigger on the master/slave data bus.

The system of the preceding paragraph can optionally include, additionally and/or alternatively, any one or more of the following features, configurations and/or additional components:

A further embodiment of the foregoing system, wherein the master node is configured to record an event time upon detection of the event trigger on the master/slave data bus.

A further embodiment of any of the foregoing systems, wherein the plurality of sensing nodes are configured to record an event time upon detection of the event or upon detection of the event trigger on the master/slave data bus.

A further embodiment of any of the foregoing systems, wherein the master node is configured to collect the first and second amount of data from the plurality of sensing nodes following the event.

A further embodiment of any of the foregoing systems, wherein the master node is configured to drive the event trigger on the master/slave data bus based upon external data received by the master node.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of collecting data in a system that includes a master controller and a plurality of slave sensors connected to communicate digital data via a master/slave data bus, the method comprising:
   commanding, by the master controller over the master/slave data bus, the plurality of slave sensors to enter an event monitoring state, wherein each of the plurality of slave sensors enter a listening mode;
   sensing, by the plurality of slave sensors, characteristics of an environment as first sensed data;
   digitizing and retaining, by the plurality of slave sensors, the first sensed data during the listening mode;
   detecting, by a first one of the plurality of slave sensors, a detected event based upon the first sensed data;
   driving, by the first one of the plurality of slave sensors in response to the detected event, an event trigger on the master/slave data bus, wherein the event trigger is a known logic state or pattern on the master/slave data bus;
   detecting, by the plurality of slave sensors, the event trigger on the master/slave data bus;
   sensing, by the plurality of slave sensors, the characteristics of the environment as second sensed data;
   recording, by the plurality of slave sensors, the second sensed data as event data in response to detection of the event trigger on the master/slave data bus; and
   returning, by the first one of the plurality of slave sensors, to the listening mode following recording event data, unless a duration associated with the event monitoring state has expired or the master controller has commanded the first one of the plurality of slave sensors to exit the event monitoring state.

2. The method of claim 1, further comprising:
   monitoring, by the master controller, the master/slave data bus for the event trigger; and
   recording, by the master controller, an event time, wherein the event time is based upon a system time or a duration from a start of entering the event monitoring state.

3. The method of claim 1, further comprising:
   recording, by the first one of the plurality of slave sensors, the detected event and an event detection time associated with the event data based on a system definition of time or a duration from a start of the event monitoring mode.

4. The method of claim 3, further comprising:
   correlating, by the master controller, the event data from the plurality of slave sensors using the event detection time.

5. The method of claim 1, further comprising:
   extracting, by the master controller, individual features regarding the detected event utilizing the event data from the plurality of slave sensors.

6. The method of claim 1, further comprising:
   processing, by the plurality of slave sensors, the event data as processed data; and
   providing, by the plurality of slave sensors, the processed data to the master controller.

7. The method of claim 1, further comprising:
   determining, by the master controller, that the first one of the plurality of slave sensors detected the detected event based upon an event type of the detected event.

8. A method of collecting data using a plurality of sensors connected to a digital master/slave data bus during an event monitoring mode, wherein the method comprises:
   commanding, by a host controller over the master/slave data bus, the plurality of sensors into a listening mode;
   collecting, by the plurality of sensors, first sensed data, wherein the plurality of sensors digitize and retain the first sensed data;
   detecting, by a first one of the plurality sensors, an occurrence of a first event based upon the first sensed data;
   driving, by the first one of the plurality of sensors, the master/slave bus with an event trigger, wherein the event trigger is a known logic state or pattern on the master/slave data bus;
   identifying, by the host controller, that the first one of the plurality of sensors detected the event upon detecting the event trigger on the master/slave data bus;
   instructing, by the host controller over the master/slave data bus, the plurality of sensors, to retain an amount of the first sensed data and record second sensed data as event data; and
   returning, by the first one of the plurality of sensors, to the listening mode following recording event data, unless a duration associated with the listening mode has expired or the host controller has commanded the first one of the plurality of sensors to exit the listening mode.

9. The method of claim 8, further comprising:
   detecting, by a second one of the plurality of sensors, a second event; and
   driving, by the second one of the plurality of sensors, the event trigger.

10. The method of claim 8, further comprising:
    detecting, by a second one of the plurality of sensors, the event trigger; and
    recording, by the second one of the plurality of sensors, an event detection time associated with the event trigger.

11. The method of claim 8, further comprising:
    recording, by the first one of the plurality of sensors, the detected event and an event detection time associated with the event data based on a system definition of time or a duration from a start of the event monitoring mode.

12. The method of claim 11, further comprising:
collecting, by the host controller, the first and second sensed data from the plurality of sensors; and
correlating, by the host controller, the first and second sensed data based on the event detection time.

13. The method of claim 12, wherein collecting by the host controller, the first and second data comprises:
processing, by the plurality of sensors, the first and second sensed data to produce processed data; and
collecting, by the host controller, the processed data from the plurality of sensors.

14. A system comprising:
a master/slave data bus;
a plurality of sensors; and
a master controller configured to communicate digitally with the plurality of sensors over the master/slave data bus, wherein the master controller is configured to command the plurality of sensors into an event monitoring mode over the master/slave data bus;
wherein the plurality of sensors are configured to digitize and retain a first amount of data during a listening mode of the event monitoring mode and detect an event based upon the first amount of data; and
wherein the plurality of sensors are further configured to drive an event trigger on the master/slave data bus upon detection of the event, wherein the event trigger is a known logic state or pattern on the master/slave data bus; and
wherein the plurality of sensors are further configured to digitize and retain a second amount of data following detection of the event trigger on the master/slave data bus and record the second amount of data as event data; and
wherein the plurality of sensors are further configured to return to the listening mode following recording of the event data, unless a duration associated with the event monitoring mode has expired or the master controller has commanded the plurality of sensors to exit the event monitoring mode.

15. The system of claim 14, wherein the master controller is configured to record an event time upon detection of the event trigger on the master/slave data bus.

16. The system of claim 14, wherein the plurality of sensors are configured to record an event time upon detection of the event or upon detection of the event trigger on the master/slave data bus.

17. The system of claim 14, wherein the master controller is configured to collect the first and second amount of data from the plurality of sensors following the event.

18. The system of claim 14, wherein the master controller is configured to drive the event trigger on the master/slave data bus based upon external data received by the master controller.

* * * * *